(12) United States Patent
McCarthy et al.

(10) Patent No.: US 8,643,795 B2
(45) Date of Patent: Feb. 4, 2014

(54) THERMALLY SWITCHED OPTICAL FILTER INCORPORATING A REFRACTIVE OPTICAL STRUCTURE

(75) Inventors: Wil McCarthy, Lakewood, CO (US); Richard M. Powers, Lakewood, CO (US)

(73) Assignee: Ravenbrick LLC, Denver, CO (US)

( * ) Notice: Subject to any disclaimer, the term of this patent is extended or adjusted under 35 U.S.C. 154(b) by 197 days.

(21) Appl. No.: 12/903,856

(22) Filed: Oct. 13, 2010

(65) Prior Publication Data
US 2011/0025934 A1 Feb. 3, 2011

Related U.S. Application Data

(63) Continuation-in-part of application No. 12/758,573, filed on Apr. 12, 2010, now Pat. No. 8,284,336.

(60) Provisional application No. 61/262,024, filed on Nov. 17, 2009, provisional application No. 61/296,127, filed on Jan. 19, 2010, provisional application No. 61/299,505, filed on Jan. 29, 2010, provisional application No. 61/262,024, filed on Nov. 17, 2009, provisional application No. 61/296,127, filed on Jan. 19, 2010, provisional application No. 61/299,505, filed on Jan. 29, 2010, provisional application No. 61/168,513, filed on Apr. 10, 2009.

(51) Int. Cl.
G02F 1/133 (2006.01)
G02F 1/01 (2006.01)

(52) U.S. Cl.
USPC ......................................................... 349/20

(58) Field of Classification Search
USPC ........................... 349/20, 168; 385/10–11, 37
See application file for complete search history.

(56) References Cited

U.S. PATENT DOCUMENTS

| 3,990,784 A | 11/1976 | Gelber |
| 4,268,126 A | 5/1981 | Mumford |
| 4,456,335 A | 6/1984 | Mumford |
| 4,475,031 A | 10/1984 | Mockovciak, Jr. |
| 4,491,390 A | 1/1985 | Tong-Shen |
| 4,512,638 A | 4/1985 | Sriram et al. |

(Continued)

FOREIGN PATENT DOCUMENTS

| CA | 2620005 | 7/2008 |
| CN | 1189224 A | 7/1998 |

(Continued)

OTHER PUBLICATIONS

Author Unknown, "Liquid Crystal Research", http://chirality.swarthmore.edu, printed Aug. 21, 2009.

(Continued)

*Primary Examiner* — Eric Wong
(74) *Attorney, Agent, or Firm* — Dorsey & Whitney LLP

(57) ABSTRACT

A thermochromic, thermotropic, or thermoreflective filter relies on a mismatch between the index of refraction of a thermotropic material (e.g., a liquid crystal) and a substrate material that includes refractive or diffractive features. At colder operating temperatures, the refraction mismatches are eliminated or minimized such that the filter becomes transparent, whereas at high operating temperatures the refraction mismatches are increased such that for light at appropriate incidence angles, the structure becomes highly reflective. This filter has particular but not exclusive application as a temperature-controlled "smart mirror" for use in windows, walls, roofing, and other building materials.

18 Claims, 7 Drawing Sheets

(56) References Cited

U.S. PATENT DOCUMENTS

| | | |
|---|---|---|
| 4,579,638 A | 4/1986 | Scherber |
| 4,640,583 A | 2/1987 | Hoshikawa et al. |
| 4,641,922 A | 2/1987 | Jacob |
| 4,688,900 A | 8/1987 | Doane et al. |
| 4,755,673 A | 7/1988 | Pollack et al. |
| 4,783,150 A | 11/1988 | Tabony |
| 4,789,500 A | 12/1988 | Morimoto et al. |
| 4,804,254 A | 2/1989 | Doll et al. |
| 4,848,875 A | 7/1989 | Baughman et al. |
| 4,871,220 A | 10/1989 | Kohin |
| 4,877,675 A | 10/1989 | Falicoff et al. |
| 4,893,902 A | 1/1990 | Baughman et al. |
| 4,899,503 A | 2/1990 | Baughman et al. |
| 4,964,251 A | 10/1990 | Baughman et al. |
| 5,009,044 A | 4/1991 | Baughman et al. |
| 5,013,918 A | 5/1991 | Choi |
| 5,025,602 A | 6/1991 | Baughman et al. |
| 5,111,629 A | 5/1992 | Baughman et al. |
| 5,152,111 A | 10/1992 | Baughman et al. |
| 5,193,900 A | 3/1993 | Yano et al. |
| 5,196,705 A | 3/1993 | Ryan |
| 5,197,242 A | 3/1993 | Baughman et al. |
| 5,227,115 A | 7/1993 | Harnischfeger |
| 5,274,246 A | 12/1993 | Hopkins |
| 5,304,323 A | 4/1994 | Arai et al. |
| 5,308,706 A | 5/1994 | Kawaguchi et al. |
| 5,319,478 A | 6/1994 | Funfschilling et al. |
| 5,347,140 A | 9/1994 | Hirai |
| 5,377,042 A | 12/1994 | Chahroudt |
| 5,481,400 A | 1/1996 | Borden |
| 5,525,430 A | 6/1996 | Chahroudi |
| 5,530,263 A | 6/1996 | DiVincenzo |
| 5,574,286 A | 11/1996 | Huston et al. |
| 5,585,640 A | 12/1996 | Huston |
| 5,757,828 A | 5/1998 | Ouchi |
| 5,763,307 A | 6/1998 | Wang |
| 5,881,200 A | 3/1999 | Burt |
| 5,889,288 A | 3/1999 | Futatsugi |
| 5,897,957 A | 4/1999 | Goodman |
| 5,937,295 A | 8/1999 | Chen |
| 5,940,150 A | 8/1999 | Faris et al. |
| 6,040,859 A | 3/2000 | Takahashi |
| 6,099,758 A | 8/2000 | Verrall et al. |
| 6,122,103 A | 9/2000 | Perkins et al. |
| 6,208,463 B1 | 3/2001 | Hansen |
| 6,218,018 B1 | 4/2001 | McKown et al. |
| 6,240,114 B1 | 5/2001 | Anselm |
| 6,281,519 B1 | 8/2001 | Sugiyama et al. |
| 6,288,840 B1 | 9/2001 | Perkins et al. |
| 6,294,794 B1 | 9/2001 | Yoshimura et al. |
| 6,304,784 B1 | 10/2001 | Allee |
| 6,320,220 B1 | 11/2001 | Watanabe |
| 6,329,668 B1 | 12/2001 | Razeghi |
| 6,333,516 B1 | 12/2001 | Katoh |
| 6,381,068 B1 | 4/2002 | Harada |
| 6,437,361 B1 | 8/2002 | Matsuda |
| 6,486,997 B1 | 11/2002 | Bruzzone et al. |
| 6,487,112 B1 | 11/2002 | Wasshuber |
| 6,493,482 B1 | 12/2002 | Al-hemyari et al. |
| 6,498,354 B1 | 12/2002 | Jefferson |
| 6,504,588 B1 | 1/2003 | Kaneko |
| 6,512,242 B1 | 1/2003 | Fan et al. |
| 6,559,903 B2 | 5/2003 | Faris et al. |
| 6,583,827 B2 | 6/2003 | Faris et al. |
| 6,600,169 B2 | 7/2003 | Stintz |
| 6,611,640 B2 | 8/2003 | LoCasclo |
| 6,661,022 B2 | 12/2003 | Morie |
| 6,671,008 B1 | 12/2003 | Li et al. |
| 6,710,823 B2 | 3/2004 | Faris et al. |
| 6,718,086 B1 | 4/2004 | Ford |
| 6,730,909 B2 | 5/2004 | Butler |
| 6,753,273 B2 | 6/2004 | Holonyak, Jr. et al. |
| 6,770,916 B2 | 8/2004 | Ohshima |
| 6,777,718 B2 | 8/2004 | Takagi |
| 6,816,525 B2 | 11/2004 | Stintz et al. |
| 6,847,662 B2 | 1/2005 | Bouda |
| 6,859,114 B2 | 2/2005 | Eleftheriades |
| 6,912,018 B2 | 6/2005 | Faris et al. |
| 6,926,952 B1 | 8/2005 | Weber et al. |
| 6,933,812 B2 | 8/2005 | Sarabandi |
| 6,946,697 B2 | 9/2005 | Pietambaram |
| 6,963,435 B2 | 11/2005 | Mallya et al. |
| 6,965,420 B2 | 11/2005 | Li et al. |
| 6,978,070 B1 | 12/2005 | McCarthy et al. |
| 6,985,291 B2 | 1/2006 | Watson |
| 6,992,822 B2 | 1/2006 | Ma et al. |
| 7,026,641 B2 | 4/2006 | Mohseni |
| 7,038,745 B2 | 5/2006 | Weber et al. |
| 7,042,615 B2 | 5/2006 | Richardson |
| 7,046,441 B2 | 5/2006 | Huang |
| 7,068,234 B2 | 6/2006 | Sievenpiper |
| 7,099,062 B2 | 8/2006 | Azens et al. |
| 7,113,335 B2 | 9/2006 | Sales |
| 7,133,335 B2 | 11/2006 | Nishimura et al. |
| 7,154,451 B1 | 12/2006 | Sievenpiper |
| 7,161,737 B2 | 1/2007 | Umeya |
| 7,166,797 B1 | 1/2007 | Dziendziel et al. |
| 7,221,827 B2 | 5/2007 | Domash et al. |
| 7,245,431 B2 | 7/2007 | Watson et al. |
| 7,276,432 B2 | 10/2007 | McCarthy et al. |
| 7,300,167 B2 | 11/2007 | Fernando et al. |
| 7,318,651 B2 | 1/2008 | Chua |
| 7,351,346 B2 | 4/2008 | Little |
| 7,385,659 B2 | 6/2008 | Kotchick et al. |
| 7,470,925 B2 | 12/2008 | Tamura |
| 7,522,124 B2 | 4/2009 | Smith |
| 7,532,397 B2 | 5/2009 | Tanaka |
| 7,538,946 B2 | 5/2009 | Smith |
| 7,561,332 B2 | 7/2009 | Little et al. |
| 7,601,946 B2 | 10/2009 | Powers |
| 7,619,816 B2 | 11/2009 | Deng |
| 7,655,942 B2 | 2/2010 | McCarthy et al. |
| 7,692,180 B2 | 4/2010 | Snyder |
| 7,755,829 B2 | 7/2010 | Powers et al. |
| 7,768,693 B2 | 8/2010 | McCarthy et al. |
| 7,911,563 B2 | 3/2011 | Hung |
| 7,936,500 B2 | 5/2011 | Powers et al. |
| 7,977,621 B2 | 7/2011 | McCarthy et al. |
| 8,072,672 B2 | 12/2011 | Powers |
| 8,076,661 B2 | 12/2011 | McCarthy |
| 8,169,685 B2 | 5/2012 | Powers |
| 8,271,241 B2 | 9/2012 | Akyurtlu |
| 8,284,336 B2 | 10/2012 | Powers |
| 2002/0079485 A1 | 6/2002 | Stintz et al. |
| 2002/0080842 A1 | 6/2002 | An |
| 2002/0085151 A1 | 7/2002 | Faris et al. |
| 2002/0114367 A1 | 8/2002 | Stintz et al. |
| 2002/0118328 A1 | 8/2002 | Faris et al. |
| 2002/0141029 A1 | 10/2002 | Carlson et al. |
| 2002/0152191 A1 | 10/2002 | Hollenberg |
| 2002/0180916 A1 | 12/2002 | Schadt |
| 2002/0190249 A1 | 12/2002 | Williams |
| 2003/0052317 A1 | 3/2003 | Ohshima |
| 2003/0059998 A1 | 3/2003 | Holonyak, Jr. |
| 2003/0066998 A1 | 4/2003 | Lee |
| 2003/0107813 A1 | 6/2003 | Clabburn et al. |
| 2003/0107927 A1 | 6/2003 | Yerushalmi |
| 2003/0129247 A1 | 7/2003 | Ju et al. |
| 2003/0138209 A1 | 7/2003 | Chan |
| 2003/0218712 A1 | 11/2003 | Kumar et al. |
| 2003/0227663 A1 | 12/2003 | Agrawal et al. |
| 2004/0005451 A1 | 1/2004 | Kretman et al. |
| 2004/0012749 A1 | 1/2004 | Freeman |
| 2004/0036993 A1 | 2/2004 | Tin |
| 2004/0256612 A1 | 12/2004 | Mohseni |
| 2005/0068629 A1 | 3/2005 | Fernando et al. |
| 2005/0185125 A1 | 8/2005 | Miyachi |
| 2005/0221128 A1 | 10/2005 | Kochergin |
| 2005/0271092 A1 | 12/2005 | Ledentsov |
| 2006/0011904 A1 | 1/2006 | Snyder et al. |
| 2006/0147810 A1 | 7/2006 | Koch |
| 2006/0151775 A1 | 7/2006 | Hollenberg |
| 2006/0238867 A1 | 10/2006 | Takeda et al. |
| 2006/0257090 A1 | 11/2006 | Podolskiy |

(56) References Cited

U.S. PATENT DOCUMENTS

| | | | |
|---|---|---|---|
| 2006/0262398 A1 | 11/2006 | Sangu et al. | |
| 2006/0274218 A1 | 12/2006 | Xue | |
| 2007/0070276 A1* | 3/2007 | Tan et al. | 349/117 |
| 2007/0121034 A1 | 5/2007 | Ouderkirk | |
| 2007/0215843 A1 | 9/2007 | Soukoulis et al. | |
| 2007/0279727 A1* | 12/2007 | Gandhi et al. | 359/242 |
| 2008/0013174 A1 | 1/2008 | Allen et al. | |
| 2008/0061222 A1 | 3/2008 | Powers et al. | |
| 2008/0117500 A1 | 5/2008 | Narendran et al. | |
| 2008/0138543 A1 | 6/2008 | Hoshino et al. | |
| 2008/0160321 A1 | 7/2008 | Padiyath et al. | |
| 2008/0204383 A1 | 8/2008 | McCarthy et al. | |
| 2008/0210893 A1 | 9/2008 | McCarthy et al. | |
| 2008/0246388 A1 | 10/2008 | Cheon | |
| 2008/0259254 A1 | 10/2008 | Kikuchi et al. | |
| 2009/0015902 A1 | 1/2009 | Powers et al. | |
| 2009/0040132 A1 | 2/2009 | Sridhar | |
| 2009/0059406 A1 | 3/2009 | Powers et al. | |
| 2009/0128893 A1 | 5/2009 | McCarthy et al. | |
| 2009/0128907 A1 | 5/2009 | Takahashi et al. | |
| 2009/0167971 A1 | 7/2009 | Powers et al. | |
| 2009/0219603 A1* | 9/2009 | Xue | 359/288 |
| 2009/0268273 A1 | 10/2009 | Powers et al. | |
| 2009/0296190 A1 | 12/2009 | Anderson et al. | |
| 2010/0001008 A1 | 1/2010 | McCarthy et al. | |
| 2010/0015363 A1 | 1/2010 | Chiang et al. | |
| 2010/0027099 A1 | 2/2010 | McCarthy | |
| 2010/0045924 A1* | 2/2010 | Powers et al. | 349/190 |
| 2010/0051898 A1 | 3/2010 | Kim II | |
| 2010/0060844 A1 | 3/2010 | Sawatari et al. | |
| 2010/0118380 A1 | 5/2010 | Xue | |
| 2010/0232017 A1 | 9/2010 | McCarthy et al. | |
| 2010/0271686 A1 | 10/2010 | Powers et al. | |
| 2010/0288947 A1 | 11/2010 | McCarthy et al. | |
| 2011/0044061 A1 | 2/2011 | Santoro et al. | |
| 2011/0102878 A1 | 5/2011 | McCarthy et al. | |
| 2011/0205650 A1 | 8/2011 | Powers et al. | |
| 2011/0216254 A1 | 9/2011 | McCarthy et al. | |
| 2011/0292488 A1* | 12/2011 | McCarthy et al. | 359/265 |
| 2012/0140311 A1 | 6/2012 | Powers et al. | |
| 2012/0262773 A1 | 10/2012 | Powers et al. | |

FOREIGN PATENT DOCUMENTS

| | | |
|---|---|---|
| CN | 1350648 | 5/2002 |
| CN | 1494091 | 5/2004 |
| EP | 1162496 | 12/2001 |
| GB | 2261989 | 6/1993 |
| JP | 58010717 | 1/1983 |
| JP | 59-231516 | 12/1984 |
| JP | 61223719 | 10/1986 |
| JP | 1178517 | 7/1989 |
| JP | 02-089426 | 3/1990 |
| JP | 06-158956 | 6/1994 |
| JP | 07-043526 | 2/1995 |
| JP | 08-015663 | 1/1996 |
| JP | 63-127594 | 8/1998 |
| JP | 10-287449 | 10/1998 |
| JP | 10-311189 | 11/1998 |
| JP | 2002-520677 | 7/2002 |
| JP | 2002-357815 | 12/2002 |
| JP | 2003-248204 | 9/2003 |
| JP | 2004-004795 | 1/2004 |
| JP | 2004-291345 | 10/2004 |
| JP | 2005-250119 | 9/2005 |
| JP | 2006-330108 | 7/2006 |
| JP | 2006-243485 | 9/2006 |
| JP | 2006-285242 | 10/2006 |
| JP | 2007-515661 | 6/2007 |
| JP | 2007-272016 | 10/2007 |
| JP | 2007-322902 | 12/2007 |
| JP | 2008-530766 | 8/2008 |
| JP | 2008-304618 | 12/2008 |
| JP | 2009-046742 | 3/2009 |
| KR | 10-2002-0013986 | 2/2002 |
| KR | 2002-0044153 | 6/2002 |
| KR | 2004-48916 | 4/2003 |
| KR | 10-2004-0108816 | 12/2004 |
| KR | 10-2003-0072578 | 4/2005 |
| KR | 10-2006-0000059 | 1/2006 |
| KR | 10-2007-0091314 | 9/2007 |
| KR | 10-2010-0039401 | 4/2010 |
| WO | 94/02313 | 2/1994 |
| WO | WO 97/01789 | 1/1997 |
| WO | WO 01/23173 | 4/2001 |
| WO | 02/064937 | 8/2002 |
| WO | WO 03/029885 | 4/2003 |
| WO | 03/096105 | 11/2003 |
| WO | 2005/031437 | 4/2005 |
| WO | WO 2006/023195 | 2/2006 |
| WO | 2006/036546 | 4/2006 |
| WO | 2006/088369 | 8/2006 |
| WO | WO 2008/092038 | 7/2008 |
| WO | 2008106596 | 9/2008 |
| WO | 2008/144217 | 11/2008 |

OTHER PUBLICATIONS

Barbagallo, S., et al., "Synthesis of novel metamaterials," Chapter 2 (VDM Verlag 2008).

Eleftheriades, G.V., et al. (Editors); Iyers, "Negative-Refraction Metamaterials," Chapter 1 (Wiley 2005), pp. 4-5, 16-30, 321-330.

Fedotov, V. A., et al., "Asymmetric Propagation of Electromagnetic Waves through a Planar Chiral Structure," The American Physical Society, PRL 97, Oct. 20, 2006, pp. 167401-1-167401-4.

Ginley, D. S., et al., "Transparent Conducting Oxides," MRS Bulletin, Aug. 2000, pp. 15-18.

Goldhaber-Gordon, David, et al., "Overview of Nanoelectronic Devices," Proceedings of the IEEE, vol. 85, No. 4, (Apr. 1997), pp. 521-533.

Hao, J. et al., "Manipulating Electromagnetic Wave Polarizations by Anisotropic Metamaterials," Physical Review Letters, 2007, vol. 99, No. 063908.

Harrison, "Quantum Wells, Wires, and Dots: Theoretical & Computational Physics of Semiconductor Nanostructures" 2nd Edition, John Wiley & Sons, LTD (2005), 3 pages.

Lan, S., et al., "Survey on Roller-type Nanoimprint Lithography (RNIL) Process," International Conference on Smart Manufacturing Application, Apr. 9-11, 2008, in KINTEX, Gyeonggi-do, Korea, pp. 371-376.

Leatherdale, C.A., et al., "Photoconductivity in CdSe Quantum Dot Solids," Physical Review B, vol. 62, No. 4, (Jul. 15, 2000) pp. 2669-2680.

Manea, E., et al., "Optical Characterization of SnO2 thin Films Prepared by Sol Gel Method, for 'Honeycomb' Textured Silicon Solar Cells," International Semiconductor Conference, 2006, vol. 1, Issue, Sep. 2006, pp. 179-182.

Manea, E., et al., "SnO2 Thin Films Prepared by Sol Gel Method for 'Honeycomb' Textured Silicon Solar Cells," Romanian Journal of Information Science and Technology, vol. 10, No. 1, 2007, pp. 25-33.

Padilla, W.J., et al., "Electrically resonant terahertz metamaterials: Theoretical and experimental investigations," Physical Review B 75, 041102(R) (2007).

Rogacheva, A.V., et al., "Giant gyrotropy due to electromagnetic-field coupling in a bilayered chiral structure," Physical Review Letters 97, 177401 (Oct. 27, 2006).

Sarychev, et al., "Negative refraction metamaterials," Chapter 8 (Wiley 2005).

Siegel, J. D., "The MSVD Low E 'Premium Performance' Myth," International Glass Review, Issue 1, 2002, pp. 55-58.

Sung, J. et al., "Dynamics of photochemical phase transition of guest/host liquid crystals with an Azobenzene derivative as a photoresponsive chromophore," Chemistry of Materials, vol. 14, No. 1, pp. 385-391, Jan. 21, 2002.

West, J. L. et al., "Characterization of polymer dispersed liquid-crystal shutters by ultraviolet/visible and infrared absorption spectroscopy," Journal of Applied Physics, vol. 70, No. 7, pp. 3785-3790, Oct. 1, 1991.

(56) References Cited

OTHER PUBLICATIONS

Zhang, W., Giant optical activity in dielectric planar metamaterials with two-dimensional chirality, Journal of Optics A: Pure and Applied Optics, 8, pp. 878-890 (2006).
Korean Intellectual Property Office as International Searching Authority, International Search Report and Written Opinion for International Application No. PCT/US2008/051959, Jun. 6, 2008, 10 pages.
Korean Intellectual Property Office as International Searching Authority, International Search Report and Written Opinion for International Application No. PCT/US2008/069881, Sep. 30, 2008, 10 pages.
Korean Intellectual Property Office as International Searching Authority, International Search Report and Written Opinion for International Application No. PCT/US2008/087964, Mar. 31, 2009, 12 pages.
Korean Intellectual Property Office as International Searching Authority, International Search Report and Written Opinion for International Application No. PCT/US2009/041576, Nov. 25, 2009, 7 pages.
Notice of Allowance, U.S. Appl. No. 12/019,602, dated Jun. 9, 2010 (now Pat. 7,768,693).
Notice of Allowance, U.S. Appl. No. 12/172,156, dated Mar. 11, 2010 (now Pat. 7,755,829).
Notice of Allowance, U.S. Appl. No. 12/843,218, dated Apr. 12, 2011.
Fan, et al., "Thin-film conducting microgrids as transparent heat mirrors", Appl. Phys. Lett., vol. 28, No. 8, Apr. 5, 1976, 440-442.
Yamazaki, et al., "Polarisation-insensitive parametric wavelength conversion without tunable filters for converted light extraction", Eletronic Letters, IEE Stevenage, GB, vol. 42, No. 6, Mar. 16, 2006, 365-367.
Notice of Allowance dated Mar. 20, 2012, U.S. Appl. No. 12/758,573, 17 pages.
Request for Continued Examination dated May 25, 2012, U.S. Appl. No. 12/758,573, 3 pages.
Notice of Allowance dated Jun. 6, 2012, U.S. Appl. No. 12/758,573, 8 pages.
Corrected Notice of Allowability & Interview Summary dated Jul. 31, 2012, U.S. Appl. No. 12/758,573, 4 pages.
Post-Allowance 37 CFR 1.312 Amendment dated Aug. 16, 2012, U.S. Appl. No. 12/758,573, 4 pages.
PTO Response to Rule 312 Amendment dated Sep. 6, 2012, U.S. Appl. No. 12/758,573, 3 pages.
Communication Pursuant to Rules 161(2) and 162 dated Nov. 17, 2011, EP Application No. 10762570.9, 2 pages.
Response to 161/162 Communications dated May 16, 2012, EP Application No. 10762570.9, 9 pages.
Supplemental European Search Report dated Aug. 16, 2012, EP Application No. 10762570.9, 7 pages.
Communication Pursuant to Rules 70(2) and 70a(2) dated Sep. 4, 2012, EP Application No. 10762570.9, 1 page.
Response to Supplemental European Search Report dated Mar. 1, 2013, EP Application No. 10762570.9, 10 pages.
First Patent Examination Report dated Jan. 23, 2013, AU Application No. 2010233076, 5 pages.
First Office Action dated Feb. 12, 2013, CA Application No. 2,760,838, 2 pages.
Response to First Office Action dated Aug. 12, 2013, CA Application No. 2,760,838, 34 pages.
First Office Action dated Apr. 23, 2013 (with English translation), CN Application No. 201080026056.4, 18 pages.
Korean Intellectual Property Office as International Searching Authority, International Search Report and Written Opinion for International Application No. PCT/US2010/030754, Oct. 26, 2010, 7 pages.
Korean Intellectual Property Office as International Searching Authority, International Search Report and Written Opinion for International Application No. PCT/US2010/052518, Jun. 1, 2011, 7 pages.
Non-Final Office Action dated Nov. 13, 2012, U.S. Appl. No. 13/646,907, 7 pages.
Response to Non-Final Office Action dated May 13, 2013, U.S. Appl. No. 13/646,907, 7 pages.
Terminal Disclaimer dated May 13, 2013, U.S. Appl. No. 13/646,907, 2 pages.

\* cited by examiner

THERMALLY SWITCHED OPTICAL FILTER INCORPORATING A REFRACTIVE OPTICAL STRUCTURE

CROSS REFERENCE TO RELATED APPLICATIONS

This application claims the benefit of priority pursuant to 35 U.S.C. §119(e) U.S. provisional patent application No. 61/262,024 entitled "Thermally switched optical filter" filed 17 Nov. 2009; U.S. provisional patent application No. 61/296,127 entitled "Thermally switched optical filter incorporating a guest-host architecture" filed 19 Jan. 2010; and U.S. provisional patent application No. 61/299,505 entitled "Thermally switched optical filter incorporating a guest-host architecture" filed 29 Jan. 2010, the disclosures of which are hereby incorporated herein by reference in their entirety. This application is also a continuation-in-part of U.S. patent application Ser. No. 12/758,573 entitled "Thermally switched optical filter incorporating a guest-host architecture" filed 12 Apr. 2010, which further claims the benefit of priority pursuant to 35 U.S.C. §119(e) of the following: U.S. provisional patent application No. 61/168,513 entitled "Large throw thermoreflective and thermoabsorptive filters" filed 10 Apr. 2009; U.S. provisional patent application No. 61/262,024 entitled "Thermally switched optical filter" filed 17 Nov. 2009; U.S. provisional patent application No. 61/296,127 entitled "Thermally switched optical filter incorporating a guest-host architecture" filed 19 Jan. 2010; and U.S. provisional patent application No. 61/299,505 entitled "Thermally switched optical filter incorporating a guest-host architecture" filed 29 Jan. 2010, the disclosures of which are hereby incorporated herein by reference in their entirety.

In addition, this application is related to U.S. Pat. No. 7,768,693; U.S. Pat. No. 7,755,829; U.S. patent application Ser. No. 12/340,552 entitled "Thermally switched absorptive window shutter" filed 19 Dec. 2008; U.S. patent application Ser. No. 12/234,383 entitled "Low emissivity window films and coatings incorporating nanoscale wire grids" filed 19 Sep. 2008; U.S. patent application Ser. No. 12/429,092 entitled "Glare management of reflective and thermo reflective surfaces" filed 23 Apr. 2009; U.S. patent application Ser. No. 12/497,365 entitled "Insulating glass unit as shipping container" filed 2 Jul. 2009; U.S. patent application Ser. No. 12/545,051 entitled "Methods for fabricating thermochromic filters" filed 20 Aug. 2009; and U.S. patent application Ser. No. 12/488,515 entitled "Optical metapolarizer device" filed 19 Jun. 2009; and the disclosures of each are hereby incorporated herein by reference in their entirety.

BACKGROUND

1. Field of Technology

This technology relates to a device for controlling the flow of light and radiant heat through selective absorption or reflection of light. The technology has particular, but not exclusive, application in passive or active light-regulating and temperature-regulating films, materials, and devices, especially as a construction material.

2. Description of the Related Art

Switchable mirrors exist which are based on reversible metal hydride and metal lithide chemistry described, for example, in U.S. Pat. No. 7,042,615 to Richardson. These switchable mirrors, which are chemically related to rechargeable batteries, may rely on the physical migration of ions across a barrier under the influence of an electric field and, therefore, have limited switching speeds and cycle lifetimes.

In addition, electrically operated "light valves" that combine liquid crystals with one or more reflective polarizers are described, for example, in U.S. Pat. No. 6,486,997 to Bruzzone et al. In these devices, a liquid crystal typically serves as an electrotropic depolarizer, i.e., a means of variably altering or rotating the polarity of the light that passes through it, under the influence of an electric field. Some of these devices can be thought of as switchable mirrors, although they are rarely described that way, since their primary application is in video displays, video projectors, and advanced optics.

Switchable electric light valves that do not require polarizers, but are diffusive forward scatterers or diffusive reflectors, also exist. This is because liquid crystals themselves may act as reflectors (including but not limited to distributed Bragg reflectors or DBRs) with different reflection bands in these applications, with a reflective, diffusive, or forward-scattering mode, and a more transmissive mode. These include the polymer-dispersed liquid crystal (PDLC) display, the cholesteric liquid crystal display (Ch-LCD), the Heilmeier display, and the Guest-Host display. The PDLC is an electrochromic device where the index of refraction of liquid crystal droplets embedded in another material is changed electrically, resulting in more scattering of the light in one mode than another. The Ch-LCD has two stable states, the reflective planar and focal conic texture. The reflective planar structure reflects light if the Bragg reflection condition is met and thus acts as a Bragg reflector for one circular polarization of light, while the reflective focal conic transmits more of the light.

An optical structure called a Guest-Host display commonly utilizes dyes dispersed in a liquid crystal, which absorb more light when in one orientation than in another. The orientation of the dyes is dependent on the orientation of the liquid crystal, which is determined using an electric field created by a voltage, typically applied via transparent conducting layers such as indium tin oxide. Such devices may also utilize one or more polarizers. There are positive and negative dichroic (pleochroic and negative dichroic) dyes, among others, which respectively absorb light along different axes of the molecule.

Polymer-stabilized liquid crystals are created when prepolymers and liquid crystals are mixed and the prepolymer is polymerized, to among other things establish or reinforce the orientation of the liquid crystals. Liquid crystal mixed with prepolymers which are cured in various ways and concentrations has been described in the literature as polymer-stabilized, polymer-networked, polymer-enhanced, and polymer-dispersed, among many other terms. This technology is well described in the prior art as, for example, in U.S. Pat. No. 7,355,668 to Satyendra et al., which discloses polymer-enhanced liquid crystal devices, specifically electrically operated display devices, built with rigid or flexible substrates that include polymer "columns" formed between substrate films through the phase separation of a prepolymer (e.g., Norland NOA77 or 78 optical adhesive) and a liquid crystal (e.g., Merck E7, E48, or E31), under the influence of temperature variations. The prepolymer and liquid crystal are mixed above the clearing point temperature of the LC, and are then cooled below the clearing point in order to separate, polymerize, and solidify the polymer network within the liquid crystal material.

More recently, in U.S. Pat. No. 7,755,892 to Powers et al., thermotropic liquid crystal shutters have been described, wherein a thermotropic liquid crystal is placed between two crossed polarizers, such that in one temperature state the liquid crystal forms a twisted nematic waveblock that rotates the polarity of incoming light, allowing the light transmission, absorption, and reflection properties of a single polarizer, while in another temperature state the liquid crystal is in an isotropic state, such that it does not affect the polarization state of incoming light. The device has the optical properties of two crossed polarizers, allowing much lower transmission and much higher absorption or reflection of incident light.

The information included in this Background section of the specification, including any references cited herein and any description or discussion thereof, is included for technical reference purposes only and is not to be regarded as subject matter by which the scope of the invention is to be bound.

SUMMARY

The technology disclosed herein is directed to the temperature-based control over transmissivity, reflectivity, or absorptivity with regard to radiant energy (e.g., visible, UV, and infrared light), including up to the entire range of the solar spectrum, for the purpose of regulating the flow of heat into a structure (e.g., a window, building, or vehicle) based on external weather conditions, internal temperature, or any combination of the two, responding over a range of temperatures that make it useful for these purposes. This technology is a device having temperature-responsive transmission, absorption, or reflection of light energy, effected by temperature-induced changes in, among other things, the structure, phase, or order of a thermotropic carrier material (e.g., a thermotropic liquid crystal), which provides temperature-dependent order (or induces temperature-dependent order) to one or more included components that interact with light (e.g., reflective or absorptive dyes, polymers, or inorganic markers), which, for purposes of this document, shall be referred to as "orientation-dependent colorants" (ODCs). Similar to usage with liquid crystal devices generally, the particular local spatial orientation characteristics of the thermotropic carrier material at a given temperature state shall be known as a "director." It should be understood that a particular thermotropic carrier material (e.g., a thermotropic liquid crystal), when used as a component of an embodiment described herein, may exhibit two or more discrete directors, or an analog range of directors, at different temperature states.

For example, at one temperature the thermotropic carrier material may induce significant order in one or more included ODCs (potentially including absorptive, reflective, or fluorescent molecules, dyes, particles, rods, polymer chains, or any combination thereof) suspended or dissolved within the thermotropic carrier material, while at a second temperature may provide little or no preferred director for these ODCs. If the director associated with the first temperature is chosen such that the included components interact less with light at the first temperature than the second temperature, the optical properties such as transmission, absorption, and fluorescence will be different at the two temperatures. The efficiency of absorption, reflection, or transmission can be varied through the selection of the included ODC materials, as can the frequency-dependent efficiencies. The choice of ODC materials may be used to affect percentages and wavelength ranges of reflection, absorption, and transmission above and below a threshold temperature, or over a selected range of temperatures, that are desirable for aesthetics, energy management, or other reasons.

Additionally, if the included ODC materials are reflective, the device may be diffusively reflective due to the distribution of orientations of the included materials. This technology has particular, but not exclusive, application as a glare reduction method for building surfaces. The efficiency, spatial distribution, bandwidth, and center wavelength of reflection can be varied as the orientation of the ODC changes under the influence of the thermotropic carrier material. Examples of reflective ODC materials include flakes, wires, rods, particles, or filaments. These may be composed of metals; of polymers or inorganic ceramic-type materials that are white or otherwise reflective in color; of polymers or inorganic ceramic-type materials that are transparent but which have refractive indices indexes significantly mismatched to that of the thermotropic carrier material; of polymer chains (e.g., polyacetylene) that have inherent reflectivities due to an electrically conductive nature; or of related materials or any combination thereof.

This technology may also be employed as a part of a device operating similarly in function to a temperature-responsive optical depolarizer, (for example, a thermotropic liquid crystal) operating with one or more polarizing filters to regulate the passage of light energy. The order provided or induced in the included materials can be polarizing (in transmission or reflection) at one temperature, and less polarizing or even non-polarizing in another. The incident energies passing through this device will therefore depend on the reflection and absorption efficiencies of both the ODCs and of the polarizers used. For example, when the ODC is induced at one temperature to be a functionally efficient polarizer, and paired with a second efficient polarizer which transmits light of this same polarization, then half of the incident radiant energy passes through the device. However, if a temperature change reduces the order of the ODC such that the ODC will block transmission of light of both polarizations, then the amount of light transmitted through the device may therefore change as well. Lower efficiency polarizers, or ODCs and polarizers with frequency-dependent efficiencies, may be selected to affect percentages of reflection, absorption, and transmission above and below a threshold temperature or over a selected range of temperatures that are desirable for aesthetics, energy management, or other reasons. This effect can be such that the device is less transmissive in either its hot or cold state, or expanded such that the transmissivity of the device is higher in the transparent state. Angle-dependent optical effects may also exist.

The thermotropic carrier material may also induce different amounts of order in one or more included ODCs (whether absorptive, reflective, or fluorescent molecules, dyes, particles, rods, polymers, or any combination thereof) suspended or dissolved within the carrier material at different temperatures. For example, the thermotropic carrier material, and any associated alignment layers or structures, may be selected such that the amount of order provided may decrease with increasing temperatures. If the director associated with the ODC is chosen such that the included components interact more with light as the temperature increases, the optical properties such as transmission, absorption, and fluorescence will therefore vary as the temperature increases. Alternatively, among other possibilities, the director may be chosen such that the included ODCs interact more with light at lower temperatures than at higher temperatures, or the order provided may increase with increasing temperature. Such devices are described, for example, in "Dichroic Dyes for Liquid Crystal Displays" by Alexander V. Ivashenko and "Liquid Crystals" (Second Edition) by S. Chandrasekhar, incorporated herein by reference. These effects may also be combined with other effects, such as those previously described, where order is present at one temperature and not at a second, or where the order changes precipitously at a given temperature or across a temperature range, or with other effects such as having different orders for a given temperature based on the temperature history (e.g., supercooling and hysteresis effects). The efficiency of absorption, reflection, or transmission response for different directors may be varied through the selection of ODC materials, as can the wavelength-dependent efficiencies. The choice of materials may be used to affect percentages and wavelengths of reflection, absorption, and transmission above and below a threshold temperature, or over a selected range of temperatures, that are desirable for aesthetics, energy management, or other reasons.

This technology may employ both specular and diffusive optical effects as described above, to create windows or window filters that exhibit both transparent and opaque privacy-type modes, and prevent the concentration of reflected solar energy in UV, visible, or IR bands in different ways. This technology may also be used to absorb, reflect or transmit, diffusively or specularly, various polarizations and wavelength ranges of light in different ways at different temperatures, to achieve particular aesthetic, privacy, glare, or solar heat gain properties.

Other features, details, utilities, and advantages of the present invention may be apparent from the following more particular written description of various embodiments of the invention as further illustrated in the accompanying drawings and defined in the appended claims.

DETAILED DESCRIPTION

For the purposes of this specification, the term "thermoreflective" shall refer to any object, device, or material having a reflectivity that varies as a function of temperature. Similarly, "thermoabsorptive" and "thermoflourescent" shall refer to any objects, devices, or materials having an absoptivity or fluorescence, respectively, that varies as a function of temperature. Since light transmission is a function of reflection, absorption, and re-radiation of light, any of these objects, devices, or materials may also be properly described by the more generic term, "thermochromic".

Figure 1:
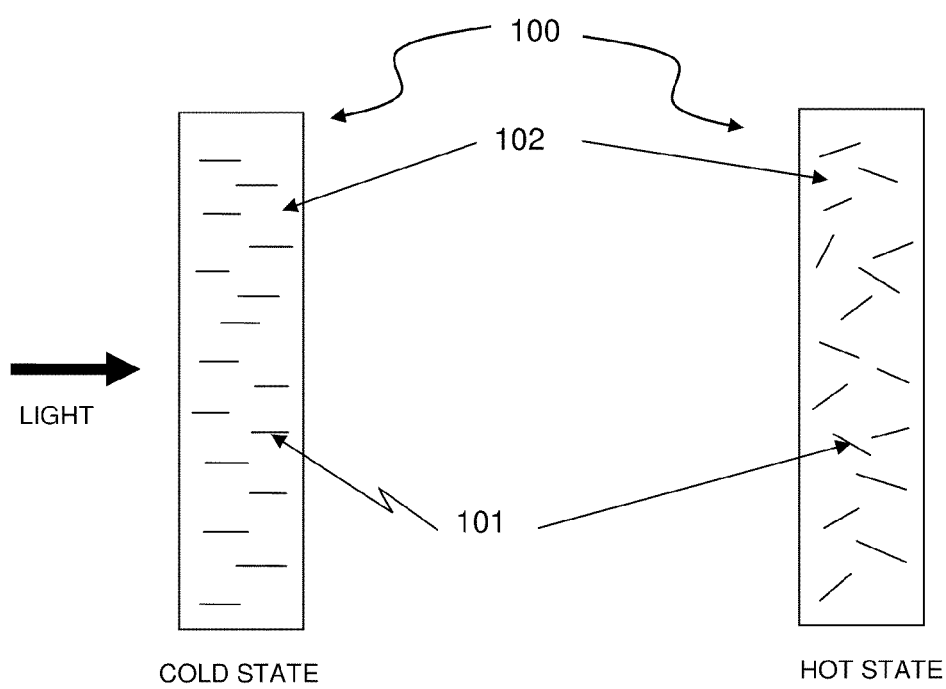
FIG. 1 is a schematic view of an exemplary implementation of a thermochromic filter having ODC materials suspended or dissolved in a thermotropic carrier material (e.g., a thermotropic liquid crystal having moledules aligned perpendicular to the substrate) that provides or induces order for the ODC materials at a lower temperature and does not at a higher temperature.

FIG. 1 is a schematic, cross-section view of an exemplary form of a thermochromic filter device 100. The filter device 100 may be composed of included "orientation dependent colorant" or ODC materials 101 inside a transmissive, thermotropic, order-providing carrier material 102. At a lower temperature, assuming that the ODC molecules interact more strongly with incoming light perpendicular to their long axis, a significant percentage of the incoming light passes through the order-providing carrier material 102 as well as the included ODC materials 101 due to their ordered orientation with respect to the incoming light. As with a shutter or venetian blind in the "open" state, the ODC materials are essentially parallel to the incoming light and thus do not substantially absorb or reflect it. At a higher temperature, more of the incoming light is blocked due to the unordered orientation of the included ODC materials, a large fraction of which are no longer parallel to the incoming light and are therefore capable of absorbing, reflecting, or otherwise interacting with it. It is notable that when the included ODC materials are in the ordered state, the filter device 100 is capable of polarizing light that enters the filter device 100 from directions other than the one indicated in the figure, and thus may be considered a "thermotropic polarizer" for some purposes.

Additional polarizers or other optical elements may also be added to produce different optical effects without affecting the essential nature thermochromic filter device 100.

The thermotropic carrier material 102 may take a variety of different forms for use within the thermochromic filter device 100. Many materials that are transparent to at least some wavelengths of light also experience changes of the amount of order of their molecules (or changes in their director or directors) with changes in temperature. In particular, many thermotropic liquid crystals are optically transparent with high (almost crystalline) order in the liquid crystalline state (i.e., nematic state), while being optically transparent with low order (e.g., a randomly or semi-randomly oriented state) in the isotropic state.

The director of liquid crystal molecules in a liquid crystal state (such as the nematic or smectic states) near a surface can be influenced through the use of alignment layers. Both vertical (homeotropic) and parallel (homogeneous) alignments are common, where the director of the liquid has respectively, a director normal or parallel to the surface. The director can be affected by the surface energy and chemistry of the surface. In general, high surface energy promotes parallel alignment and low surface energy promotes vertical alignment. In the prior art, polydimethylsiloxanes, for example, are commonly used to promote vertical alignment and rubbed polyimides, for example, are used to promote parallel alignments. Methods for promoting various alignments and pre-tilt angles, their intermediaries, hybrids, combinations, and the resulting useful structures when liquid crystal molecules are placed near one, two, or more surfaces are generally known, have been well described in the prior art, and will be familiar to a person of ordinary skill in the art. More complex orientation states also exist and have also been described. For example, in the liquid crystal "blue phase," the director of the liquid crystal molecule rotates in a helical fashion about any axis perpendicular to a line.

If the thermotropic carrier material is a liquid crystal (LC) material, it may be required to meet environmental tolerance specifications that are consistent with the environment in which the device is to be used. For example, in an exemplary thermochromic window application the LC may require a clearing point between 0° C. and 35° C., and more preferably between 20° C. and 30° C., a freezing point below −40° C., a boiling point above 90° C., and enough UV resistance to survive 30 years of daily exposure to sunlight (possibly attenuated by glass, polarizers, UV-blocking adhesives, and other materials inherent in the thermochromic window structure). Other requirements may also exist, such as a birefringence sufficient to produce the desired retardation across a particular cell gap. In particular it may be desirable for the device to have a small cell gap in order to minimize the amount of liquid crystal required. This would in turn imply a minimum birefringence for the LC mixture, in order to achieve the desired optical effects.

In general for LC mixtures, properties such as birefringence and clearing point are close to the weighted average of the individual components, whereas properties like UV resistance or chemical resistance may be limited by, or more strongly dependent on, the resistance of the least resistant component. Additionally, properties such as freezing point depend on the interactions of individual molecules, which become less favorable for crystallization as the molecules become more dissimilar from one another. Thus, when two LC components are mixed together, the resulting mixture may exhibit a freezing point significantly lower than either component by itself. Also, while the solubility of different LC components differs significantly depending on their molecular structure, the solubility may be improved when different components are present in the mixture, i.e., the solubility of two mixed components in a third component may be greater than the solubility of either component separately.

For example, although 7CB liquid crystal has a freezing point of approximately 30° C. and a clearing point of approximately 41° C., when mixed in equal proportions with 5CB liquid crystal, which has a freezing point of approximately 23° C. and clearing point of approximately 34° C., the LC mixture yielded has a clearing point of approximately 37° C. and a freezing point well below −70° C. However, this mixture may be no more UV-stable than either of its components, and the chemical susceptibilities of both components still exist in the mixture, as both molecules are capable of acting as organic solvents, especially at high temperature, and may thus attack certain organic substrate materials.

Mixtures of assorted LC components, which are combined to produce particular thermal, physical, chemical, and optical properties (including "eutectic" mixtures), are generally known. Perhaps the best known commercial LC mixture is E7, which is commonly used in video displays and is a mixture of 5 different LC components. The dominant component is 5CB (which has a low clearing point, good solubility, and small birefringence), but the mixture also contains significant quantities of 7CB, 8OCB, 5OCB, and 5CT (which has a high clearing point, poor solubility, and large birefringence). The mixture is designed to have a broad nematic range, a high clearing point, and a low freezing point, and the high solubility of the 5CB helps overcome the low solubility of the 5CT.

The principles and design rules of LC mixtures such as these have been well described in the art.

In the prior art, dye molecules have sometimes been included in liquid crystals in electrochromic devices as described, for example, in "Dichroic Dyes for Liquid Crystal Displays" by Alexander V. Ivashchenko. Such systems are often called Guest-Host systems and the devices called dichroic devices. With proper selection of guest components (i.e., ODCs) and host components (i.e., electrotropic carrier materials), the dye molecules assume (approximately) the director of the liquid crystal molecule. Absorption and other related optical effects often occur along an angle "near" the director of the ODC molecule, and can have a slight difference (e.g., 5-10 degrees) between the director and maximum absorption angle. There are positive (pleochroic) and negative dichroic dyes which respectively absorb light along different axes of the molecule. Therefore, some embodiments disclosed herein may be understood as resembling an electrochromic Guest-Host system, except that the carrier material has been designed such that it is thermotropic (as described, for example, in U.S. patent application Ser. No. 12/172,156 to Powers et al. entitled "Thermally switched reflective optical shutter"), rather than electrotropic.

The orientation-dependent colorant (ODC) materials may also take a number of forms. For example, pleochroic dye systems generally have higher dichroic ratios and order parameters than negative dichroic dye systems. Embodiments may be constructed that utilize either positive or negative dichroic dyes, or a combination thereof, to affect different transmission properties across temperature ranges (e.g., shifting the color balance or hue). Performance of the dyes and system is affected by ultraviolet light (UV) stability, solubility, and order parameter of the dye(s) within the system. Performance of the system is also affected by liquid crystal host parameters, viscosity, order parameter, temperature range of physical states, stability, and birefringence. Note that Guest-Host systems for liquid crystals and dichroic dyes are often such that multiple dyes of one class are better at solvating, i.e., a mixture of similar dyes may have a greater total concentration than would be possible for any of the component dyes. Chemical "scaffolding" of dyes can also increase their solubility (e.g., attaching a liquid crystal molecule chemically to the dye molecule).

These various properties can be used to design a device with desirab\transmission properties. For example, if a particular dye has otherwise desirable properties (e.g., high UV stability) but low solubility in the desired Host, the thickness of the Guest-Host system can be increased to increase the attenuation of light transmitted. It should also be understood that many dyes that are unsuitable for electrochromic Guest-Host devices (e.g., cloth dyes) may be suitable for thermotropic devices because device operation is not contingent on electric fields.

Chiral (dopant) molecules may also be added to Guest-Host systems to change or improve the absorption or reflection of the guest(s). For example, a nematic liquid crystal system with multiple twists can be constructed using such molecules in order to affect contrast ratio or other optical properties. Optically active molecules can also be used as guests in Guest-Host systems, and can be used to construct systems that interact (e.g., reflectively) with circular polarizations of light.

Semiconducting materials may also be used as guests to provide infrared absorbing and reflecting Guest-Host systems.

Side-chain liquid crystals, polymer nematic liquid crystals, and nematic side-chain polymers, and other such Host systems may have slower electrochromic response times (or have no electrochromic response) when used in electrochromic Guest-Host devices, but they may be particularly suitable for thermotropic systems. Dye copolymers with liquid crystal may be employed to improve effective solubility. Crystalline polymer liquid crystal with embedded or copolymer dyes may be employed to provide a transition of order without a nematic or other such state. Such a device would not function electrochromically, but may be actuated by a thermotropic carrier. Doped polyacetylene copolymers and/or side-chains with liquid crystal are also alternative embodiments of systems disclosed herein.

The order (or order parameter) of the Host system generally varies with temperature (as described, for example, in "Liquid Crystals Second Edition" by S. Chandrasekar) and the order (or order parameter) of the Guest or ODC varies with it. In general, for classes of liquid crystal Host chemistries or mixtures, as the clearing point increases, so does the order parameter of a particular Guest. Also, in general, as the clearing point of the resulting system is approached, the order parameter drops. These variations in order (or order parameter) can be continuous or discrete, or both, depending on the system and temperature range. For example, in Guest-Host nematic liquid crystal systems, the order parameter of the host materials may be reduced by increases in temperature until the clearing point, where the liquid crystal then becomes isotropic, and then the order of both the Guest and Host may be effectively eliminated.

It should be understood that the director of the order in such systems can be determined using appropriate alignment materials and techniques. Further, the amount of order (order parameter) for a given Guest material (i.e., the included ODC material) is a function of the Host material chosen as well as the temperature, and that through skillful materials selection and system design, it is possible to achieve many different relationships of temperature vs. order. One desirable property in a temperature relation is to have the order parameter of the Guest vary monotonically with temperature over the temperature design range of the device. Another desirable property is to incorporate hysteresis into the temperature relation. For example, in a nematic, thermotropic liquid crystal Guest-Host device utilizing the transition from nematic to isotropic states, it may be desirable for aesthetic reasons to have the "transition" temperature be several degrees higher when the device is transitioning from nematic to isotropic than when transitioning from isotropic to nematic, as this will reduce the probability that the device will rapidly change transmission characteristics back and forth when near the transition temperature.

Polyacetylene is one polymer which can be modified chemically to become highly electrically conductive. This and other highly conductive polymers can strongly interact with light reflectively, as in a wire-grid polarizer, and the interaction can be dependent on the orientation of the molecule. Conductive polymers can also interact with light absorptively, with the interaction dependent on the orientation of the molecule as well. Both polymers and dye molecules can be integrated into polymer stabilized twisted nematic (PSTN) structures, as well as other polymer/liquid crystal systems. By choosing the order parameter of the doped polyacetylene properly, it will be possible to select the ratio of forward to backward scattering of devices using conductive polyacetylene, as well as made with other similar ODC Guests. Polyacetylene molecules can also have chemical "scaffolding" molecules attached to them to increase their solubility.

Polyacetylene polymer can be manufactured into a reflective polarizer by using it as the Guest with polymer liquid crystal as the Host, and then cooling the system until the polymers are fixed in place. Polyacetylene can also be manufactured into reflective polarizers in processes like those used to manufacture PVA-iodine polarizers.

The human eye responds to the relative amounts of several ranges of visible light. Thus many different spectral distributions may appear identical to the human eye. Metamerism is the matching of apparent color of objects with different spectral power distributions, and colors that match this way are called metamers. The absorption, transmission, fluorescence, and reflection of light by molecules (such as dye molecules) has a spectral (frequency) component to it. By properly selecting components (e.g., combinations of dyes), it is possible to select the perceived hue of transmission or reflection, or to select the specific spectrum, or amount of energy, that is transmitted or reflected, including UV, visible, or IR light.

Numerous other combinations of thermotropic carrier ("host") and orientation-dependent colorant ("guest") materials are possible beyond those discussed or enumerated here and may be employed without departing from the spirit of this embodiment.

Figure 2:
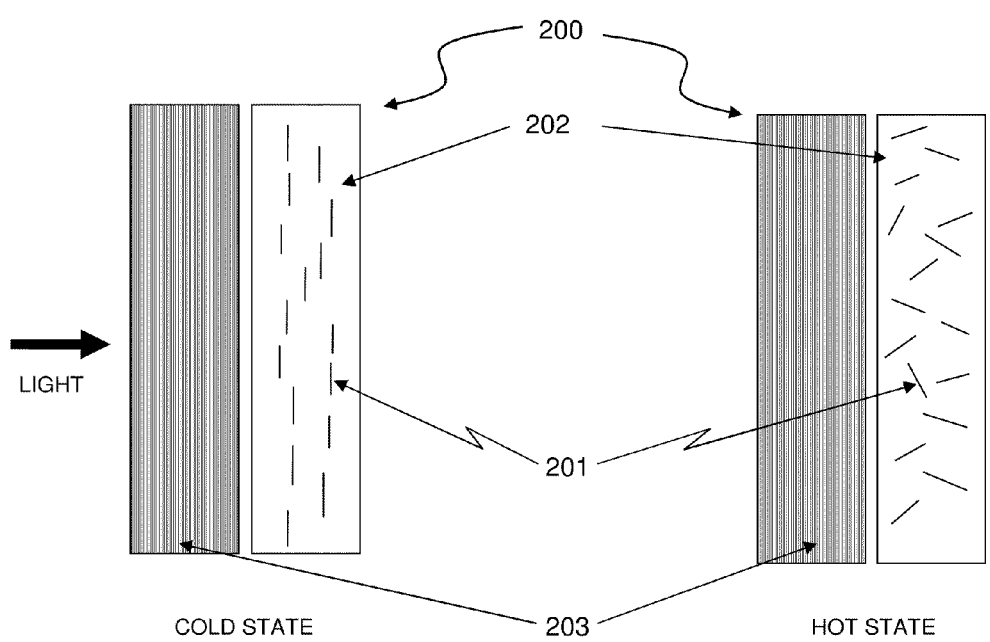
FIG. 2 is a schematic view of an exemplary implementation of a thermochromic filter used in combination with a polarizer. The thermochromic filter has ODC materials suspended or dissolved in a thermotropic carrier material (e.g., a thermotropic liquid crystal having molecules are aligned parallel to the substrate) that provides or induces order for the ODC materials at a lower temperature and does not at a higher temperature.

FIG. 2 is a schematic, cross-section view of another exemplary embodiment of a thermochromic filter device 200. As in the prior embodiment of FIG. 1, included ODC materials 201 are inside an order-providing thermotropic carrier material 202. A polarizing film 203 is placed between the incident light and the thermotropic carrier material 202 containing the included ODC materials 201. However, assuming that the ODC molecules interact more strongly with light along their long axis, the order provided is now such that the included materials 201 interact preferentially with one polarization of light. The polarizer 203 also interacts with this same polarization of light. Thus, in the lower temperature state, if together the "thermotropic polarizer" created by the ordered state of the included materials 201 and the polarizer 203 efficiently polarize the light, then approximately 50% of the light is transmitted by the device. In the higher temperature state, the "thermotropic polarizer" created by the ordered state of the included materials 201 no longer exists. The polarizer 203 still interacts with one polarization of light, but now the included materials interact with both polarizations of light, reducing the amount of light transmitted to below 50%.

This arrangement may be advantageous for increasing the contrast ratio of a Guest-Host system, or for producing other desirable optical effects (e.g., particular combinations of absorption and reflection at particular wavelengths) that would be difficult to achieve with the guest (ODC) and host (carrier) materials alone. The exact arrangement of the layer may deviate from the depiction in FIG. 2 without significantly affecting the functioning of the device. Optically speaking, it is of little consequence whether photons pass through the polarizer and then the guest-host system, or vice-versa. Various types of polarizers can be used, including absorptive, reflective, diffusive, and diffractive polarizers. In addition, more than one polarizer may be employed, and various optional components such as substrates, adhesives, sealants, solubility promoters, bandblock filters, longpass filters, shortpass filters, and fixed tints may be added in any combination without departing from the spirit of this embodiment.

However, it should be noted that if a retarder, waveblock, or birefringence compensation film or layer is employed, then the ordering of the layers does matter. For example, the polarization axis of a linear polarizing film is typically parallel to the draw direction of the film. However, if light passes through the polarizer and then a waveblock layer, the resulting polarized light can be "rotated" such that its polarization axis occurs at 45 degrees (or some other desirable angle) to the draw direction. This may be useful in that in some cases a 45-degree polarization axis allows for a simpler manufacturing process, as described in U.S. patent application Ser. No. 12/545,051 by Powers et. al. Alternatively, compensating to some angle slightly larger or smaller than 45 degrees may help to "open up" the light transmission of the filter by effectively misaligning the polarizers, such that the contrast ratio of the device is reduced and the blocking-state light transmission is increased, as described for example in U.S. Patent Application #2009/0015902 to Powers et. al.

It may be desirable in some circumstances to place waveblocks on both polarizers in a two-polarizer device, or on all polarizers in a multiple-polarizer device. It may also be desirable in other circumstances to place such optical films on only one polarizer. For example, two polarizers "rotated" by 45 degrees each may be comparable to one polarizer "rotated" by 90 degrees and one polarizer not rotated at all. Reducing the number of waveblocks may reduce the cost of the final product while retaining the same functionality. Therefore, it may be recognized that waveblocks, retarders, birefringence compensation films, birefringent materials of particular thickness, or other related polarity-rotating materials or devices may be combined in a large variety of ways in various implementations of this technology.

The amount of polarity rotation provided by a retarder/waveblock or birefringence compensation film or coating is proportional to both the birefringence and the thickness of the waveblock material. Thus, it is straightforward to devise a film or coating to achieve very precise amounts of polarity rotation, and the methods for doing so require no further elaboration here, except to note that achromatic waveplates will generally introduce fewer color anomalies than non-achromatic waveplates. The implementation also encompasses versions where a standard polarizer and thermotropic polarizer have perpendicular or otherwise non-parallel polarization axes, negative dichroics with parallel alignment, with and without an ordinary (non-thermotropic) polarizer, and versions wherein the device becomes more reflective, absorptive, or fluorescent when hot.

Figure 3:
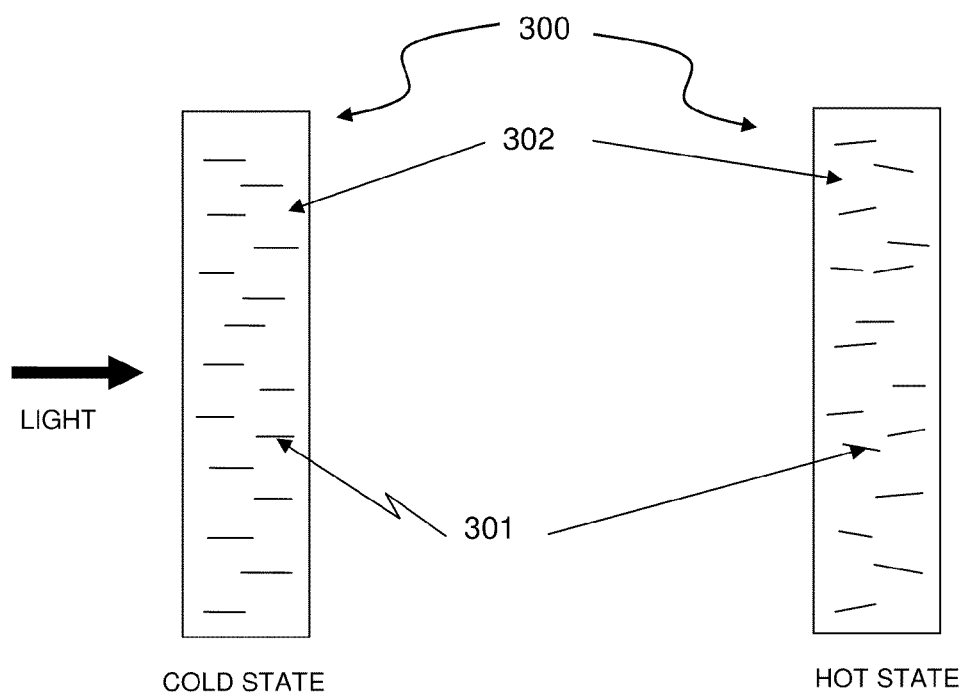
FIG. 3 is a schematic view of another exemplary implentation of a thermochromic filter having ODC materials suspended or dissolved in a thermotropic carrier material e.g., a vertically-aligned thermotropic liquid crystal) that provides or induces more order in the ODC materials at a lower temperature than it provides at a higher temperature.

FIG. 3. is a schematic, cross-section view of another exemplary embodiment of a thermochromic filter device 300. As in the prior embodiments of FIGS. 1 and 2, included ODC materials 301 are inside an order-providing, thermotropic carrier material 302. At a lower temperature, a given percentage of the incoming light passes through the order-providing material 302 as well as the included materials 301 due to their ordered orientation with respect to the incoming light. At a higher temperature, the order of the included materials is reduced (but the order parameter is not zero), so that more of the incoming light is absorbed or reflected due to the unordered orientation of the included materials. Thus for this device, the reduction in transmitted light may be more gradual than for the embodiment of FIG. 1. Note that this device may polarize light coming from directions other than the one indicated in the figure at both the lower and higher temperatures, as the included ODC materials are in ordered orientations at both temperatures, and thus may be considered a "thermotropic polarizer" for some purposes.

It should be understood that the structure and orientations depicted in FIG. 3 may exist as either the only possible states of the device, or as intermediate states. For example, a particular arrangement of ODC materials and thermotropic carrier materials may produce the orientations of FIG. 1 at extreme temperatures and the orientations of FIG. 3 at more modest temperatures, without departing from the spirit of either embodiment or of this disclosure as a whole.

Figure 4:
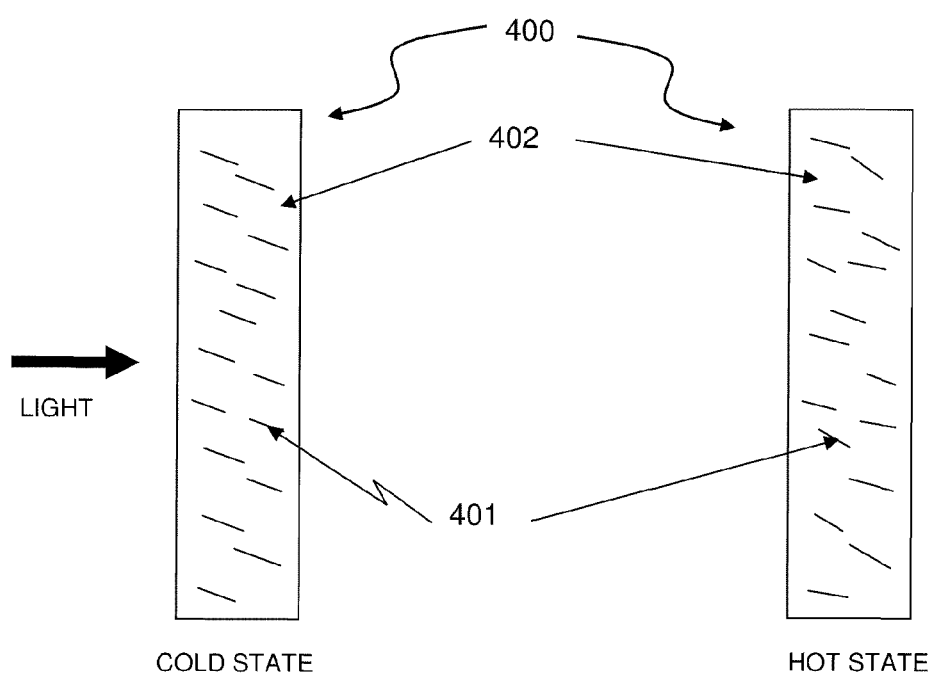
FIG. 4 is a schematic view of a further exemplary implementation of a thermochromic filter having ODC materials suspended or dissolved in a thermotropic carrier material (e.g., a vertically aligned thermotropic liquid crystal) where the directional polarizing properties of one or more thermotropic polarizer layers are used to vary the transmission properties (including polarizing effects) of the filter based on the direction of the light being transmitted.

FIG. 4. is a schematic, cross-section view of an additional exemplary embodiment of a thermochromic filter device 400. As in the prior embodiments of FIGS. 1, 2, and 3, included ODC materials 401 are inside an order-providing, thermotropic carrier material 402. However, at a lower temperature, a given percentage of the incoming light passes through the order-providing material 402 as well as the included ODC materials 401 due to their ordered orientation with respect to the incoming light. Further, at a higher temperature, the order of the included ODC materials 401 is reduced (but the order parameter is not zero), so that more of the incoming light is absorbed or reflected due to the unordered orientation of the included ODC materials 401. Thus for this thermochromic filter device 400, the reduction in transmitted light may be more gradual than for the embodiment of FIG. 1. Again, this thermochromatic filter device 400 polarizes light coming from directions other than the one indicated in FIG. 4 at both the lower and higher temperatures. However, the director of the included ODC materials 401 (determined by the system) is chosen in accordance with desirable interactions of the thermochromatic filter device 400 with light that varies in incoming direction (e.g., such as with solar energy, which varies in incoming direction both due to rotation of the planet as well as due to season).

The structure and orientations depicted in FIG. 4 may exist as either the only possible states of the device, or as intermediate states. For example, a particular arrangement of ODC materials and thermotropic carrier materials may produce the orientations of FIG. 1 at extreme temperatures and the orientations of FIG. 4 at more modest temperatures, without departing from the spirit of either embodiment or of the present disclosure as a whole.

The included ODC materials may be any number of materials including dyes, rods, particles, or polymers in a thermotropic (e.g., nematic) liquid crystal carrier material. Properly selected ODC guest materials will assume the order and director of the liquid crystal while the liquid crystal is in the nematic state (or other liquid crystalline states such as smectic), and somewhat or completely lose their order while the liquid crystal is in the isotropic state. Then if the liquid crystal is in a liquid crystalline state (e.g., nematic) and aligned vertically between two transparent parallel surfaces, light traveling through the device perpendicular to the surfaces will not significantly interact with the included ODCmaterial (e.g., positive dichroic dyes). However, as the temperature increases (i.e., above the isotropic temperature), the thermotropic liquid crystal will not have an aligned order. Thus, the liquid crystal will be more randomly oriented and will not impart order to the included materials, which will also be randomly oriented and thus interact significantly more with light traveling through the device perpendicular to the surfaces. Note again here, the guest material need not be a liquid crystal.

In a further implementation of this embodiment, the included ODC material may be an electrically conductive polymer. This selection is not made for electrical reasons per se, but for the desirable optical properties (absorption and reflection) that are typical of electrically conductive materials. Thus, the interactions with light may be selected to be either reflective or absorptive, or any combination thereof. In the randomly oriented state, the reflections may not be specular, but rather diffusively reflective, which is desirable in many applications.

In some implementations of this embodiment, the included ODC materials may be inside a thermotropic carrier material (e.g., thermotropic liquid crystal), which provides a director parallel to the surfaces (i.e., is aligned in parallel) and thus light traveling through the device perpendicular to the surfaces will interact with the included ODC material (e.g., positive dichroic dyes) as a polarizer. One or more polarizers that are part of the device may be oriented such that they do not interact with the light that is transmitted through the polarizer formed by the included materials. However, as the temperature increases (i.e., rises above isotropic temperature), the material (e.g., a thermotropic liquid crystal) will not have an aligned order, but will be more randomly oriented, and thus will not impart order to the included materials. Thus, the included materials will also be randomly oriented and interact significantly more with light of the polarization transmitted by the polarizer(s), if any, and change how much light is transmitted.

In other implementations, the included ODC materials interact with light such that when their director is perpendicular to the surfaces, the included materials interact with the light (e.g., absorb, reflect, or fluoresce the light) more strongly than when their director is parallel to the surfaces (i.e., negative dichroics).

While several exemplary embodiments are depicted and described herein, it should be understood that implementations of the invention as defined in the claims are not limited to these particular configurations. For example, the polarizers (if any) employed in the structure may be linear or circular, absorptive or reflective, diffusive or specular, and/or fixed or thermotropic in nature. One or more polarizers used in the device may be spectrally selective or may be selected to have a high or low polarizing efficiency. The order-providing materials can be thermotropic liquid crystals, ice/water, phase change materials, crystalline structures, or any of many forms of matter which can provide order to the included ODC materials. The polarizers, including thermotropic polarizers, may be in any relation to each other. The devices may be configured to become more transmissive with increases in temperature. Negative and positive dichroic ODCs may also be combined.

In addition, it should be understood that in some cases the order and director may be provided by the ODC material itself (e.g., crystalline materials), such that the "guest" and "host" functions are combined in a single, carefully selected or constructed material. For example, molecular chains of polyacetylene can act as electrical "wires" and may be an excellent candidate ODC "guest" material. However, polyacetylene chains also exhibit liquid crystal properties, and thus may be considered a "host" candidate as well, or a component of the host.

Alternatively or in addition, the included ODC "guest" materials and or the thermotropic carrier or "host" materials may be attached to or constrained by a polymer or polymer network that is part of the substrate material, or may be attached to one or more of the substrate's surfaces.

In another variant of the above embodiments, the order of the host material, and thus of the included ODC material, may also be changed by an electrical "override". An electrical "override" may be present for the order-providing material, for example by changing the order and director of a nematic liquid crystal through the use of torquing electrical fields. Alternatively, the guest material may be the locus of the electrical "override" (e.g., as in a suspended particle device). This may be particularly effective in cases where the ODC "guest" or thermotropic "host" consist of, or include, an electrically conductive polymer as described above.

The included materials may be selected to provide desired transmission, reflection, fluorescence, and absorption characteristics, spectrums, hues, or aesthetics, or to provide desirable energy transmission, absorption, and reflection characteristics. In addition, multiple thermochromic devices, of either the same type or of different types, may be combined to produce different aesthetic, optical, thermal, privacy, visual contrast, or solar heat gain properties. The amount of order may locally or globally increase with temperature rather than decrease, or the device may be constructed such that the transmission of light increases with increasing temperature. The guest mixture may be monochrome or black, tinted, fluorescent, and/or metameric.

In another possible implementation, the device may additionally be a thermotropic polymer dispersed liquid crystal device. For this purpose, the Guest-Host system may be selected for low solubility in the polymer, or a low birefringence Host (e.g. liquid crystal) may be matched with the optical index of the polymer to improve device performance and optical clarity.

It should also be understood that any or all of the embodiments and variants described above may be paired with a number of optional components without altering their essential nature or function. These may include, but are not limited to, substrates, fixed tints, adhesives, sealants, wave plates, reflectors, partial reflectors, transreflectors, low-emissivity materials, UV-absorptive or reflective materials, and/or IR absorptive or reflective materials.

Additionally, there may be materials that provide more order at higher temperatures, or different amounts of order at different temperatures, such as the change in order and director with changes in temperatures that occurs in thermotropic liquid crystals that have both nematic and smetic states. Devices thus may be based on changes in the director or order with temperature rather than simply upon a loss of order with changes in temperature. Additionally, the included ODC material may in fact be simply in proximity to the order providing carrier material rather than wholly dissolved or suspended within it, or may induce changes in the amount of order the order-providing material provides at various temperatures.

Figure 5:
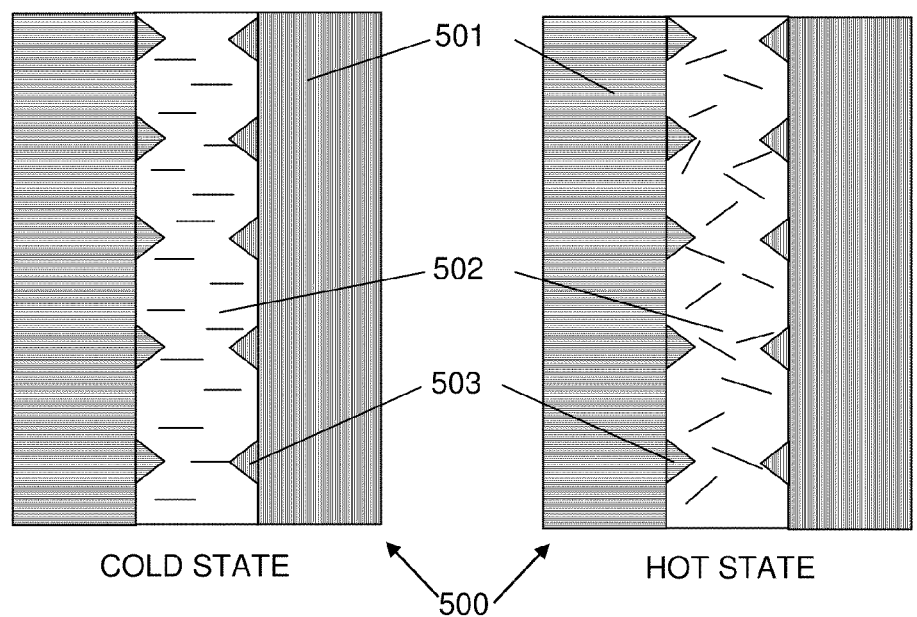
FIG. 5 is a schematic view of an implementation of a "large-throw" thermoreflective optical filter a type of filter in which the polarizers "disappear" at low temperature.

FIG. 5 is a schematic representation of an implementation of a "large throw" optical filter (i.e., one whose transmissivity varies by more than 50% between the block and pass states), a type of thermoreflective filter in which the polarizers "disappear" at low temperature. The device includes of a pair of polarizers 501 oriented substantially orthogonally to each other and placed on opposite sides of a thermotropic material 502. However, in this embodiment one or both polarizers 501 are a diffractive-type polarizer that relies on sub-wavelength-sized features 503 including, but not limited to, ridges, trenches, pits, or mounds composed of a material (e.g., a transparent polymer) with a significantly different index of refraction from the surrounding medium. Typically, diffractive-type polarizers may be fashioned, for example, by micro-etching a glass surface (as with the Jenoptik diffractive polarizers produced by MEMS Optical, Inc.) and then overcoating the patterned glass with a material (e.g., a transparent polymer) that has a much higher or lower index of refraction.

However, in the present implementation there is no solid overcoat to the nano-embossed features. Rather, these features are in direct contact with the thermotropic material 502 (e.g., a low-clearing-point liquid crystal, i.e., having a threshold temperature between liquid phases between 0° C. and 35° C.). In addition, the thermotropic material has been selected such that in its cold state (e.g., a nematic, smectic, crystalline, or amorphous state below the clearing-point/threshold temperature) its index of refraction is identical to or similar to that of the features in the diffractive type polarizer. In this state, the absence of a refraction mismatch at the relieved surface causes the features to be largely invisible and the diffractive-type polarizer to be nonfunctional. Therefore, the device does not polarize incoming light and is thus largely transparent.

However, the thermotropic depolarizer has also been selected such that in its hot state (e.g., a liquid or isotropic state above the clearing-point/threshold temperature), its index of refraction is significantly different from the relieved features of the diffractive type polarizer. In this state, the refraction mismatch causes the relieved features to be visible and the diffractive-type polarizer to be functional. Thus, an incoming photon "sees" the device as a pair of crossed polarizers and is blocked (e.g., reflected or absorbed).

The net effect of these behaviors is that the theoretical transmissivity of the device may approach 100% in the cold state, and may approach 0% in the hot state. Unfortunately, the nature of a diffractive-type polarizer is that strong polarization effects may only be applied to light that strikes the surface at "glancing" angles (e.g., beyond the critical angle and/or Brewster's angle for the diffractive structures). However, there are optics that can "pre-direct" the incoming light entering the diffractor from "more normal" to "more parallel" with respect to the surface. With appropriate choices for the shape and optical index of the refractive or diffractive surface, along with the optical indices of the LC and other components, it is possible to pre-direct the light in such a way that in one state the majority of the incoming light for a given range of incidence angles is reflected, and in the other state a majority of the incoming light for a given range of incidence angles is transmitted. Thus, with sufficient pre-directing refractive optics, embodiments of the device as depicted in FIG. 5 may function as thermotropic, polarizing, switchable mirrors.

Figure 6:
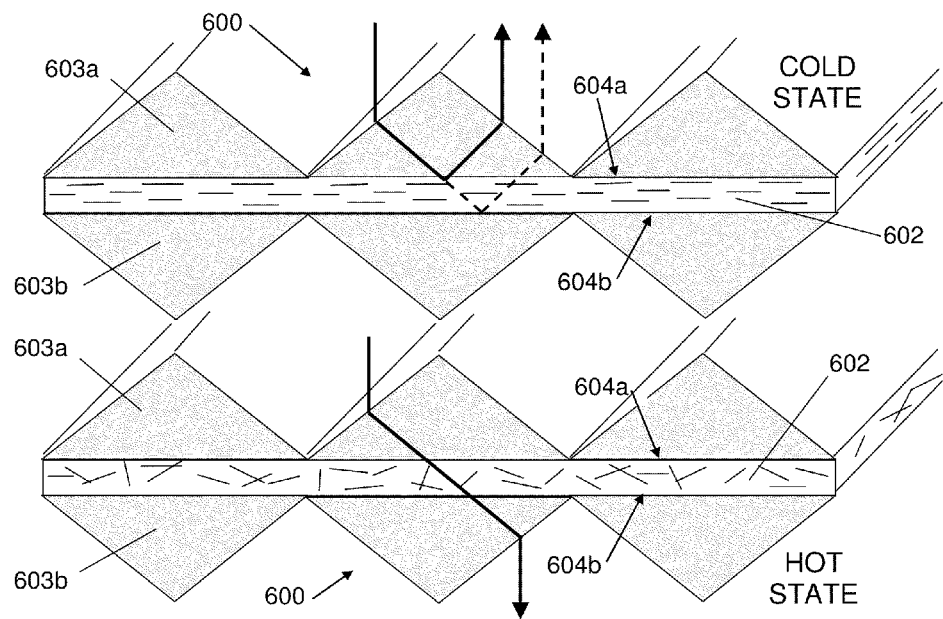
FIG. 6 is a schematic view of a thermotropic device having a thermotropic liquid crystal surrounded by pairs of refractive elements with a clearing point of the liquid crystal selected to occur within the operating temperature range of the device.

FIG. 6 depicts a thermotropic device 600 incorporating elements of the thermotropic device of FIG. 5. In this embodiment, a thermotropic liquid crystal 602 is surrounded by pairs of refractive elements 603a/b. The clearing point of the liquid crystal 602 may be selected to occur within the operating temperature range of the device 600, such that the device 600 behaves thermotropically, i.e., at a low operating temperature the liquid crystal 602 is in its nematic state, and at a high operating temperature the liquid crystal is in its isotropic state.

The index of refraction of the refractive elements 603a/b may be referred to as $n_g$. In the nematic state, the liquid crystal 602 is a birefringent material possessing two indices of refraction, $n_e$ and $n_o$, along orthogonal directions, such that the index of refraction $n_{eff}$ encountered by a photon passing through the LC material 602 is dependent on both the direction of travel and the polarization state of the photon. In the isotropic state, the liquid crystal 602 is a non-birefringent material with a single index of refraction $n_i$. Furthermore, the liquid crystal 602 may be selected such that $n_i = n_g$, and $n_o < n_g < n_e$. Thus, in the isotropic state, a photon passing through the device 600 encounters a uniform index of refraction across multiple layers, and is not reflected, refracted, or diffused. As a result, the device 600 operates in an opposite manner to typical thermoreflective devices, i.e., it is transparent when hot and reflective when cold.

This occurs because in the cold state, the nematic liquid crystal 602 presents a high-low refraction mismatch to both polarizations of light, and thus will reflect photons that impinge at angles shallower than the critical angle. In the nematic state, a photon of one polarization state, passing from the first refractive element 603a into the liquid crystal 602 encounters a drop in the index of refraction from $n_g$ to the smaller value $n_o$. Therefore, if the incident angle of this photon to the refractive element-liquid crystal interface 604a is less than the critical angle for total internal reflection, the photon will be reflected. Similarly, a photon of the opposite polarization state passing from the first refractive element 603 into the liquid crystal 604 encounters a rise in the index of refraction from $n_g$ to the higher value $n_{eff}$. Because the refraction mismatch is low-to-high rather than high-to-low, the conditions for total internal reflection do not occur at this interface 604a, and the photon is not reflected. However, when the photon strikes the second interface 604b between the liquid crystal 604 to the lower refractive element 603b, it encounters a drop in the index of refraction from $n_{eff}$ to the smaller value $n_g$ (a high-low mismatch). If the incident angle is less than the critical angle for total internal reflection, this photon will be reflected from this lower interface. Thus, in its nematic state the device 600 is capable of reflecting both polarizations, or close to 100% of incident light.

The shape of the refractive element 603 may be selected such that photons for a broad range of incidence angles will arrive at the high-low refraction mismatch at an angle more glancing than the critical angle and will thus be reflected. However, in the hot state the isotropic liquid crystal 602 does not present a refraction mismatch, and thus there is no reflection. A photon approaching the device, even at normal incidence, is refracted through the upper refractive element 603a and then "straightened" by the lower refractive element 603b, so that the device appears transparent. If the refractive elements 603a/b are sufficiently small, the lateral image displacement produced by this refraction may not be apparent to the human eye.

However, in an alternative embodiment of this device 600, the indices of refraction may selected such that $n_o = n_g$, and $n_o < n_i < n_e$. In this configuration, the hot (isotropic) state produces a refraction mismatch in the device 600 and thus yields 100% reflection for photons of both polarization approaching at the appropriate incidence angle. The cold (nematic) state produces a refraction mismatch for one polarity of light but not the other, and thus for an unpolarized light source (e.g., sunlight), the device will reflect approximately half of the incident light.

Figure 7:
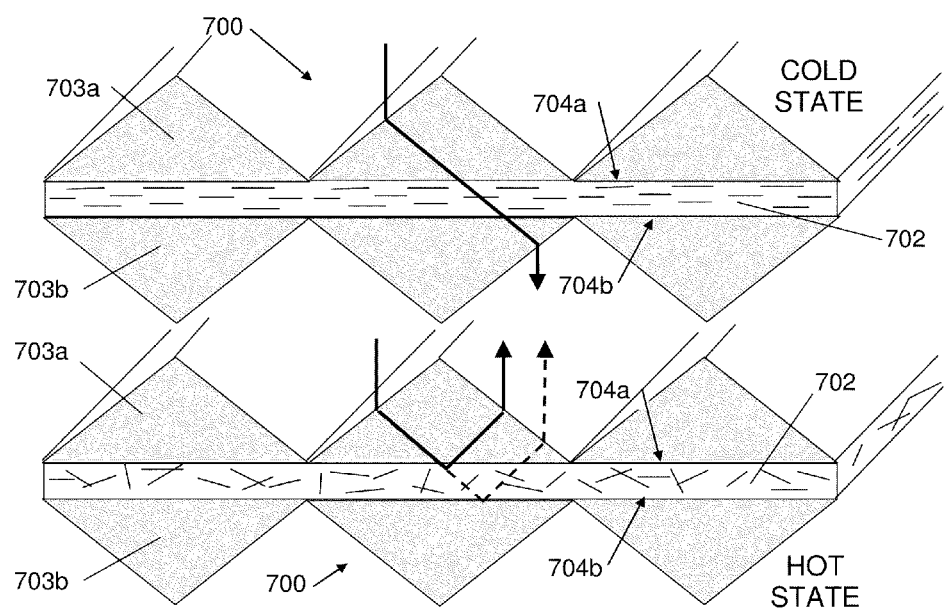
FIG. 7 is a schematic view of a thermoreflective filter that is capable of reflecting approximately 100% of incident light in the hot state and transmitting approximately 100% of incident light in the cold state for a broad range of incident angles.

FIG. 7 shows a further variant on the device of FIG. 6, wherein the thermoreflective behavior has been fully inverted such that for a broad range of incident angles the device is capable of reflecting approximately 100% of incident light in the hot state and transmitting approximately 100% of incident light in the cold state. In one exemplary embodiment, this inversion is accomplished by making the refractive elements 703a/b out of a birefringent material and selecting the liquid crystal material 702 and a liquid crystal alignment layer such that in the cold (nematic) state, the $n_e$ and $n_o$ of the liquid crystal 702 match the $n_{ge}$ and $n_{go}$ of the refractive elements 703a/b. Thus, a photon of either polarization, passing through the device in the cold (nematic) state, does not see any index of refraction mismatch, and thus the device is transparent. However, in the hot state the index of refraction of the liquid crystal 702 changes to $n_i$, which matches neither the $n_{ge}$ nor the $n_{go}$ of the refractive structure 703a/b. For a typical uniaxial, calamitic liquid crystal, $n_o < n_i < n_e$. Thus, one polarization of light experiences a high-low refraction mismatch, and reflection is possible under the conditions described above, and the other polarization does not experience a refraction mismatch. Thus, the device has a "throw" of approximately 50%, going from ~100% transmissive in the cold state to ~50% reflective and ~50% transmissive in the hot state.

To achieve 100% throw, a second device may be stacked with the first, at an orientation of 90 degrees, such that the same effect is achieved for the other polarization of light. In a more general sense, it may be advantageous to stack multiple devices at different orientations to achieve particular levels of transmission, reflection, and thermotropic "throw" for particular polarizations.

However, other embodiments are possible that may achieve the same effect without the need for the refractive structures 703 to be birefringent. Optical anisotropy is usually defined as the difference between largest index and smallest index. In each uniaxial liquid crystal, there is one axis that is that is different than the others, and this is defined as $n_e$. Thus for discotics, the larger value is usually $n_o$, while for calamitics the larger value is $n_e$. Positive optical anisotropy for uniaxial calamitic liquid crystals (the most common type of liquid crystal for electro-optical devices such as LCD video displays) means $n_e = n_\| > n_o = n\perp$. Negative optical anisotropy means $n_o > n_e$. There are also discotic liquid crystals that have an $n_o = n_{parallel}$ for light approaching from any direction in the plane of the "disc" of the LC, and an $n_e = n_{perpendicular}$ for light approaching perpendicular to the plane. For discotics, $n_o$ and $n_e$ are switched in the literature vs. calamitics, because the "director" for calamitics is along the LC molecule's long axis, but the "director" for discotics is along the LC molecule's axis of revolution. In addition, there are biaxial liquid crystals that have a different index of refraction for each of three spatial axes (typically though not necessarily orthogonal).

The $n_{eff}$ is an important parameter here, as it varies with the incident angle and polarization state of the light. We are most concerned with this parameter when the angle is larger than the critical angle. For high angles, a vertically aligned calamitic has two very different optical indices $n_{eff}$ and $n_o$ ($n_e \approx n_{eff} >> n_i > n_o$), but similarly for a horizontally (homogenous) aligned calamitic, at glancing angles the same two optical indices $n_{eff}$ and $n_o$ are very similar ($n_e >> n_i > n_{eff} \approx n_o$). If a given index is equal to or greater than the index for the glass or other refractive material ($n_g$), then for that polarization the device 700 will be transmissive (with some minor losses due to Fabry-Perot reflection).

Thus, for thermal management applications, it is preferable to design devices where in the "cold" state one or both indices ($n_o$ or $n_e$) are equal to or greater than $n_g$, and where in the "hot" state one or both indices ($n_o$ or $n_e$) are less than $n_g$. For calamitic (rod-like) LCs, when melted or disorganized into the isotropic state, the two $n_e$ indices "decrease" to $n_i$ and the one $n_o$ index "increases" to $n_i$; thus for transmission cold and reflection hot, one cold state index needs to be at least $\geq n_g$, and the hot state "indices" $n_i < n_g$. Thus, for calamitics, $n_e > n_i > n_o$; ranges of indices for thermotropic devices that transmit light in the cold (nematic) state require vertically aligned calamitics ($n_e = n_g$, $n_o < n_g$), but provide only 50% throw per device. Alternatively, for discotic (disk-like) LCs, alignment of the disk-shaped molecules on edge results in $n_o \approx n_{eff} > n_i >> n_o$ for glancing angles, and stacked or columnar alignment results in $n_o > n_i >> n_{eff} \approx n_e$. Thus, for discotics, it is preferable to align the unique axis director horizontally (disks on edge). This allows (at high incidence) for the S and P polarizations to encounter $n_o = n_g$ in the cold cold state, and to encounter $n_i < n_g$ in the hot state. For discotics, $n_o > n_i >> n_e$ (recalling that $n_o$ and $n_e$ are flipped, since by definition $n_e$ is the "singular" axis, and $n_o$ is the "two identical axis" parameter), so this results in a 100% throw in theory. Note, however, that the stacked or columnar version results in a device that has the same 50% reflective to 100% reflective properties as in other embodiments described above).

The fact that in the nematic state a device using either a calamitic or a discotic LC has at least one optical index that varies with incidence means that either embodiment of the device is a thermotropic polarizer, but other configurations are possible where both polarizations are reflected or transmitted equally.

Furthermore, the alignment layer may be configured such that the liquid crystal molecules lie flat against the refractive structures 703a/b (also known as homogenous or planar alignment), either parallel or perpendicular to the long axis of the refractive structures 703a/b, or at any angle in between. Alignment layers may also be vertical (homeotropic), such that the liquid crystal molecules stand straight up, or they may occur at any pre-tilt angle between 0 and 90 degrees from the plane of the substrate. In addition, the top and bottom surfaces of the liquid crystal cell may have alignment layers with different characteristics. The most familiar example is the twisted nematic cell in which both the upper and lower alignment layers are horizontal, but are oriented 90 degrees apart from each other in the horizontal plane, or at some other angle that may be convenient for the device design. Another example is the so-called "pi cell", which has horizontal alignment on one surface and vertical or near-vertical alignment on the other. However, countless other types and combinations of alignment layers are possible.

Closely related Brewster angle effects and Fabry Perot effects can be designed into the device, in addition to or in place of the total internal reflection effects described above, without altering the fundamental nature of the device as a thermotropic switchable mirror. Optional layers may also be added to improve the optics, such as antireflective or refraction-matching layers, without altering the essential nature of the device. In addition, because many embodiments of the device have strongly polarization-dependent effects, the device may be treated as a polarizer and combined with other polarizers, with or without additional optics, to produce thermochromic, thermoreflective, and electrochromic devices.

As a building material (e.g., a component of smart window, smart wall, or smart roofing systems), implementations also yield a number of directional advantages. Because the sun is at a high angle during the hot months (e.g., summer in the Northern hemisphere), and at a low angle during the cool months (e.g., winter in the Northern hemisphere), the device can be oriented such that summer sun is rejected after transition because the incident angle is low enough for total internal reflection, but the winter sun passes through partially or entirely because the incidence angle is much steeper. Parameters such as optical indices and critical angles may be selected to enhance or reduce these effects. In fact, the device may be seen as an angle-selective transmitter even when it is not thermochromic. For example, if an air gap is used in place of the liquid crystal layer, then there will always be a large refraction mismatch and the refractive structures may be selected such that the high-angle summer sun is reflected and the low-angle winter sun is partially or wholly transmitted.

An alternate implementation of the device can be constructed wherein the "cold" state uses a refraction-matched fluid in the cell gap so that the cell gap "disappears" and the device is transparent, and the "hot" state uses a non-refraction matched fluid, gas, or vacuum so that the cell gap presents a high-low index of refraction mismatch to produce approximately 100% reflection as described above. Thermotropic control over the device could then be achieved through a fluid reservoir sized such that the fluid's coefficient of thermal expansion causes the fluid to fill the cell gap completely above a threshold temperature, and empty it completely below a second threshold temperature, as with a fluid-based thermometer. Therefore, for the purposes of this document, the fluid/gas or fluid/vacuum mixture (when so configured) may be described as a thermotropic material even if the fluid and gas molecules do not display inherently thermotropic properties.

Numerous variations in the liquid crystal structure may be employed as well, including not only isotropic and nematic phases, but also smectic phases, "blue phase," chiral and/or cholesteric liquid crystals, ferroelectric (banana-shaped) liquid crystals, and others. Thus, it is relatively straightforward to select the LC and alignment layer such that any part of the LC cell exhibits a desired index of refraction along a desired direction at a desired location within the LC cell. Thousands of different liquid crystal molecules are known, and can be used either singly or in polyspecific mixtures so, within the limits of what is physically and chemically possible, a truly vast number of LC and alignment combinations are possible which may differ in detail from the embodiment depicted in FIG. 7, but which serve the same or very similar function within the device. Other thermotropic structures or materials, not composed of liquid crystal, could be used to achieve the same effect including, but not limited to, thermotropic cloud gels, solid or liquid materials with high coefficients of thermal expansion, and thermomechanical microstructures that adjust the size or density of an optical material or adjust an optical structure such as a Fabry-Perot gap.

In addition, while the refractive elements depicted herein are long, tube-shaped rods with a triangular cross-section (i.e., prisms), in part because prismatic films with this structure are commercially available at reasonable cost, a vast number of other structures, or combinations of structures (including fractals), could be used instead, and that the selection of liquid crystal and alignment layer properties may depend on the nature of the refractive structures or, alternatively, that the selection of refractive structures may be made based on the refractive properties of the LC cell, which in turn may be based on the observed index of refraction for different incidence angles and polarization states. Furthermore, additional optical structures may be added to "pre-bend" or "pre-steer" the light, either for one polarization or for both polarizations, such that its incident angle is moved closer to or further from the critical angle for total internal reflection.

Furthermore, optional components may be added to any or all of embodiments described in this document, and others not described but clearly derivable. Such optional components include but are not limited to optical devices such as prisms and diffraction gratings, coatings, films, spacers, fillers, stabilizers, polymer dopants, polymer networks, or support structures that may be added to suit the needs of a particular application or a particular manufacturing method, and degraded forms of some embodiments can be produced by deleting or substituting certain components. The exact arrangement of the various layers can be different than is depicted here and, depending on the materials and wavelengths selected, different layers can be combined as single layers, objects, devices, or materials, without altering the essential structure and function of the claimed invention.

Although the description above contains many specificities, and reference to one or more individual embodiments, these should not be construed as limiting the scope of the invention but rather construed as merely providing illustrations of certain exemplary embodiments. There are various possibilities for implementation of different materials and in different configurations and those skilled in the art could make numerous alterations to the disclosed embodiments without departing from the spirit or scope of this invention.

In addition, although various embodiments of this invention have been described above with a certain degree of particularity, all directional references e.g., inside, proximal, distal, upper, lower, inner, outer, upward, downward, left, right, lateral, front, back, top, bottom, above, below, vertical, horizontal, clockwise, counterclockwise, left circular, and right circular are only used for identification purposes to aid the reader's understanding and do not create limitations, particularly as to the position, orientation, or use of the invention. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. Specific values cited in this text, such as transition temperatures, clearing points, and percentages of reflection, transmission, or absorption are illustrative and shall not be limiting. More generally, it is intended that all matter contained in the above description or shown in the accompanying drawings shall be interpreted as illustrative only and not limiting. Changes in detail or structure may be made without departing from the basic elements of the invention as defined in the following claims.

What is claimed is:

1. A thermoreflective or thermoabsorptive filter comprising
    a diffractive-type polarizer having a first index of refraction;
    a thermotropic material adjacent to the diffractive-type polarizer; wherein
    the thermotropic material is configured such that below a threshold temperature the thermotropic material has a second index of refraction that is substantially similar to the first index of refraction such that incident light is not substantially refracted at an interface between the diffractive-type polarizer and the thermotropic material and thus the filter is largely transparent; and
    the thermotropic material is configured such that above the threshold temperature the thermotropic material has a third index of refraction that is substantially different from the first index of refraction such that incident light is substantially refracted at the interface between the diffractive-type polarizer and the thermotropic material and thus the filter is attenuating to the incident light.

2. The filter of claim 1 further comprising a second polarizer adjacent the thermotropic material on an opposite side from the diffractive-type polarizer and having a polarization substantially orthogonal to a polarization of the diffractive-type polarizer.

3. The filter of claim 2, wherein the second polarizer is a diffractive-type polarizer.

4. The filter of claim 1, wherein the diffractive-type polarizer is a transparent material with an etched surface.

5. The filter of claim 1, further comprising a refractive optical component that directs incident light toward the diffractive-type polarizer at an acute angle of incidence with respect to a surface of the diffractive-type polarizer.

6. The filter of claim 1, further comprising a refractive optical component that directs incident light toward the diffractive-type polarizer at a substantially normal angle of incidence with respect to a surface of the diffractive-type polarizer.

7. The filter of claim 1, wherein the thermotropic material is a liquid crystal having a clearing-point within a temperature range of 0° C. to 35° C.

8. The filter of claim 1, wherein
    at a first temperature a first percentage of the incident light is reflected from the device and a second percentage of the incident light is transmitted through the filter; and at a second temperature a third percentage of the incident light is reflected from the device and a fourth percentage of the incident light is transmitted through the device.

9. The device of claim 2, wherein above the threshold temperature up to 100% of incident light is reflected by the device, and below the threshold temperature down to 0% of incident light is reflected by the device.

10. The device of claim 2, wherein the diffractive-type polarizer reflects up to 50% of the incident light and transmits a majority of non-reflected incident light when the thermotropic material is above the threshold temperature; and the second polarizer reflects up to 100% of incident light transmitted by the diffractive-type polarizer when the thermotropic material is above the threshold temperature and transmits up to 100% of the incident light transmitted by the diffractive-type polarizer when the thermotropic polarizer is below the threshold temperature.

11. A thermoreflective filter comprising a thermotropic, birefringent material having axial indices of refraction $n_o$ and $n_e$ in a first temperature state and a single index of refraction $n_i$ in a second temperature state, and a single layer of one or more refractive structures positioned adjacent the thermotropic, birefringent material and capable of altering a path of an incoming photon; wherein $n_o$ and $n_e$ and the axial indices of reflection of the refractive structures are selected such that interfaces between the thermotropic, birefringent material and the refractive structures have indices of refraction whereby in the first temperature state photons of a certain polarization and incidence angle beyond a critical angle are reflected upon striking the interfaces, while in the second temperature state photons of a same polarization and incidence angle are transmitted through the interfaces.

12. The thermoreflective filter of claim 11, wherein the one or more refractive structures comprise a prism or prisms.

13. A thermoreflective filter comprising a thermotropic, birefringent material having axial indices of refraction $n_o$ and $n_e$ in a first temperature state and a single index of refraction $n_i$ in a second temperature state, and a simile layer of one or more birefringent, refractive structures positioned adjacent the thermotropic, birefringent material, capable of altering the path of an incoming photon, and having axial indices of refraction close to $n_o$ and $n_e$; wherein $n_o$ and $n_e$ and the axial indices of reflection of the birefringent, refractive structures are selected such that interfaces between the thermotropic, birefringent material and the birefringent refractive structures have indices of refraction whereby in the first temperature state photons of a certain polarization and incidence angle beyond a critical angle are strongly or totally reflected upon striking the interfaces, while in the second temperature state photons of a same polarization and incidence angle are transmitted through the interfaces.

14. The thermoreflective filter of claim 13, wherein the one or more refractive structures comprise a prism or prisms.

15. A thermoreflective filter device comprising two of the thermoreflective filters of claim 13 oriented substantially orthogonally to each other.

16. A thermoreflective filter device comprising two or more of the thermoreflective filters of claim 13 at various orientations with respect to each other.

17. The thermoreflective filter of claim 11, further comprising a second single layer of one or more refractive structures positioned adjacent to and on an opposite side of the thermotropic, birefringent material from the single layer, wherein the second single layer is capable of altering the path of an incoming photon, and having axial indices of refraction close to $n_o$ and $n_e$.

18. The thermoreflective filter of claim 13, further comprising a second single layer of one or more birefringent, refractive structures positioned adjacent to and on an opposite side of the thermotropic, birefringent material from the single layer, wherein the second single layer is capable of altering the path of an incoming photon, and having axial indices of refraction close to $n_o$ and $n_e$.

* * * * *